June 26, 1923.

P. L. BRADLEY

LENS MOUNTING

Filed June 20, 1921

1,460,334

Paul L. Bradley    INVENTOR.

BY Hazard & Miller
ATTORNEYS.

Patented June 26, 1923.

1,460,334

UNITED STATES PATENT OFFICE.

PAUL L. BRADLEY, OF LOS ANGELES, CALIFORNIA.

LENS MOUNTING.

Application filed June 20, 1921. Serial No. 479,000.

*To all whom it may concern:*

Be it known that I, PAUL L. BRADLEY, a citizen of the United States, residing at Los Angeles, in the county of Los Angeles and State of California, have invented new and useful Improvements in Lens Mountings, of which the following is a specification.

My invention relates to new and useful improvements in mountings for camera lenses, the principal objects of my invention being to provide a relatively simple, practical and easily operated mounting, which in addition to being strong and substantial in structure is very compact and adapted when properly manipulated to firmly retain the carried lens at any desired point throughout a wide range of angular adjustment and consequently enabling the camera user to very accurately position the lens with respect to the object being photographed and to the sensitized plate or film within the camera.

To achieve best results in photography, it is desirable that the base of the camera occupy a horizontal plane and that the lens carrying member or front board be arranged so that it is firmly and rigidly supported at the proper distance in front of the sensitized plate or film.

In making photographs of objects which have considerable height, it very frequently becomes necessary to tilt the camera vertically, or tilt the lens board, in order that all parts of the photographed object will appear on the plate or film; and where such practice is resorted to, it frequently happens that portions of the resulting picture are out of focus and appear distorted. It is one of the objects of my invention to eliminate these undesirable results and to provide an improved form of lens mounting that is capable of being easily and quickly manipulated for adjusting the angular position of the lens and for firmly holding the same after such adjustment, and consequently enabling practically all parts of the object that is being photographed to be properly focused upon the sensitized plate or film and enabling the production of a finished picture that is evenly "balanced" with respect to an intermediate horizontal plane, or the horizontal plane of vision.

With the foregoing and other objects in view, my invention consists in certain novel features of construction and arrangement of parts that will be hereinafter more fully described and claimed, and illustrated in the accompanying drawings, in which:

Figure 1:
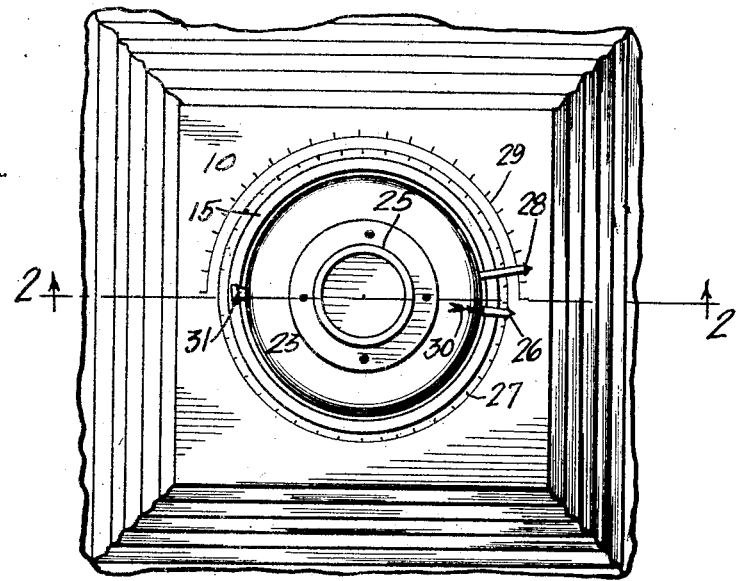
Fig. 1 is a front elevational view of a portion of a camera, showing my improved lens mount in position upon the front or lens board thereof.
Figure 2:
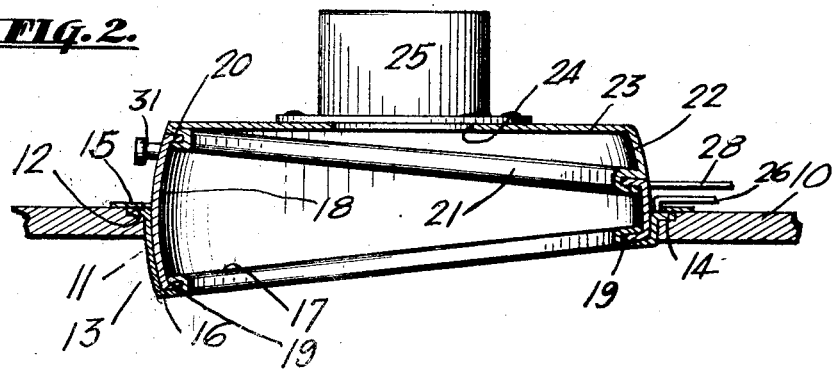
Fig. 2 is an enlarged horizontal section taken approximately on the line 2—2 of Fig. 1.

Referring by numerals to the accompanying drawings, which illustrate a practical embodiment of my invention, 10 designates the front or lens board of a camera, which when properly constructed to receive my improved form of lens mount, is provided with a circular opening 11 the outer edge of which is recessed or rabbeted as designated by 12.

Arranged to rotate freely within the opening 11 is a ring-shaped member 13, preferably, the segment of a sphere that is formed of metal, having its outer edge bent laterally to form a flange 14 that fits snugly within the recess or rabbet 12. This member 13 is retained in position upon the lens board 10 by a flat ring plate 15 that is secured to the front face of the lens board 10 in any suitable manner, the inner edge of said ring plate overlying the flange 14.

The inner edge of the member 13 is inclined with respect to its front or outer edge, such construction making the member 13 substantially wedge-shaped in cross section, and formed integral with the inclined inner edge of said member is an inwardly presented flange 16, and the inner edge of the latter is rebent to form an annular retaining lip 17.

Positioned within the wedge-shaped member 13 and projecting forwardly therethrough, is a relatively short spherical segment 18 that is slightly smaller in diameter than the member 13, and the inner or rear edge of said member 18 is bent inwardly to form a marginal flange 19 that is positioned behind the retaining lip 17. Thus, the member 18 is mounted for rotary movement upon the inner member 13.

The front and rear edges of the spherical segment 18 are inclined with respect to each other and with respect to the plane occupied by the front or lens board 10, and thus said member 18 is substantially wedge-shaped in cross section.

The forward or outer edge of member 18 is bent inwardly to form a relatively narrow marginal flange 20, and mounted for rotary movement upon said flange is the inner edge 21 of a spherical segment 22 that is approximately of the same diameter as member 18.

Formed integral with the front edge of member 22 is a plate 23 in the center of which is formed an opening 24, and fixed in any suitable manner to said plate 23 and projecting outwardly therefrom immediately over said opening 24, is an ordinary lens-carrying cylinder or barrel 25.

The rear edge 21 of the member 22 or the edge that engages the flange 20 on member 18, is inclined with respect to the plane occupied by front plate 23; consequently, said member 22 is substantially wedge-shaped in cross section, and when the parts of the mount are adjusted so that they occupy their normal positions with the axis of the lens intersecting the center of the plate or film, the front plate 23 of the outer member 22 occupies a position parallel with and a slight distance in front of the lens board 10.

Secured to the narrow side of member 13 is the inner end of an outwardly projecting pointer 26, and arranged on the front face of the lens board 10, immediately adjacent to the outer edge of retaining ring 15, is a circular graduated scale 27 with which said pointer 26 is adapted to co-operate when adjusting the position of the inner member 13 of the mount.

Fixed to the narrow side of intermediate member 18 is an outwardly projecting pointer 28 that is adapted to co-operate with an arcuate graduated scale 29 that is arranged on the front face of lens board 10 and, preferably, above the lens mounting.

Arranged on the front face of plate 23 of the outer member 22 and adjacent to the edge thereof, is a designating mark 30 which latter serves as a guide for correctly positioning said outer member with respect to inner member 13, and said designating mark is arranged at the point where said outer member 22 has the greatest width.

Projecting outwardly from the side of intermediate member 18 that has the greatest width, is a pin 31 that is adapted to be engaged when said intermediate member is rotated in adjustment of the parts of the mount.

Obviously, by independently rotating the inner, intermediate and outer members of the mount, the lens within the barrel or cylinder 25 may be moved throughout a wide range of horizontal and vertical angular adjustment with respect to the vertical plane occupied by the plate or film within the camera, and consequently the focal axis of said lens can be brought to any point upon said plate or film, with the result that pictures made of objects of considerable height will appear without distortion, and in evenly balanced position, upon the plate or film.

Obviously, by rotating the inner member 13 the angular positions of the intermediate and outer members will be changed, and further and more accurate adjustment of the angular position of the lens with respect to the plate or film is attained by proper rotation of the intermediate and outer members, and which latter may be independently or simultaneously rotated.

The pointers 26 and 28, co-operating respectively with the graduated scales 27 and 29, provide a micrometer adjustment of the angular position of the lens; and such accuracy insures the production of evenly balanced pictures.

While I have illustrated and described my improved device as being particularly applicable for use as a mounting for camera lenses, it will be understood that practically the same structure, with slight modifications in size and form, may be advantageously employed as an angularly adjustable mounting for the revolving backs of cameras, for mounting cameras upon tripods and for mounting various implements and structures such as telescopes, leveling instruments, aerial defense rifles, heavy duty ordnance, hoisting machinery, and the like.

It will be readily understood that minor changes in the size, form and construction of the various parts of my improved lens mounting may be made and substituted for those herein shown and described without departing from the spirit of my invention, the scope of which is set forth in the appended claims.

I claim as my invention:

1. An angularly adjustable mount for camera lenses, comprising a plurality of connected independently movable spherical segments each of which is substantially wedge-shaped in cross section.

2. An angularly adjustable mount for camera lenses, comprising an inner spherical segment mounted for rotation upon a lens board, a lens-carrying member, and an intermediate spherical segment connecting said spherical segment and the lens-carrying member, which spherical segments and lens-carrying member are substantially wedge-shaped in cross section.

3. A camera lens mounting comprising a lens-carrying spherical segment the body of which is substantially wedge-shaped in cross section, and a rotatably mounted spherical segment upon which said lens-carrying segment is mounted for rotation, which rotatably mounted segment is substantially wedge-shaped in cross section.

4. A camera lens mounting comprising an inner member mounted for rotation upon a camera lens board, said rotatably mounted member being substantially wedge-shaped in cross section, an intermediate member mounted for rotation upon said inner member, and a lens-carrying member mounted for rotation upon said intermediate member, which lens-carrying member is substantially wedge-shaped in cross section.

5. An angularly adjustable mount for camera lens, comprising a pair of rotatably mounted wedge-shaped spherical segments and an intermediate wedge-shaped spherical segment forming a connection between said rotatably mounted spherical segments.

6. An angularly adjustable mount for camera lens, comprising a pair of rotatably mounted wedge-shaped spherical segments, an intermediate wedge-shaped spherical segment forming a connection between said rotatably mounted members, and a lens carried by one of said rotatably mounted spherical segments.

7. The combination with a camera lens board, of a spherical segment mounted for rotation thereupon, which segment is substantially wedge-shaped in cross section, an intermediate spherical segment mounted for rotation upon said first mentioned member, which intermediate segment is substantially wedge-shaped in cross section, and a lens-carrying member adjustably mounted upon the outer portion of said intermediate member.

8. The combination with a camera lens board, of a member mounted for rotation thereupon, which member is substantially wedge-shaped in cross section, an intermediate member mounted for rotation upon said first mentioned member, which intermediate member is substantially wedge-shaped in cross section, a lens-carrying member adjustably mounted upon the outer portion of said intermediate member, and which lens-carrying member is substantially wedge-shaped in cross section.

9. A mount for camera lenses comprising a plurality of members rotatably sustained upon each other at their edges, and a lens carried by one of the members, the edges of each member being of spherical form and arranged in converging relation to each other whereby rotation of one member upon the other will vary the angular position of the lens with respect to the axis of the members.

10. A mount for camera lenses comprising a plurality of superimposed members having inclined interengaging edges whereby each member may be independently rotated with respect to the member to which it is connected, a lens carried by one of said members, and means for accurately determining the degree of rotary movement of each member.

11. A lens mounting comprising a stationary member, a second member movable on the first member, and a third lens carrying member movable on or with the second member whereby by adjustment of the second and third members the angular position of the lens can be varied.

12. A mount for camera lenses comprising a plurality of spherical segments having inclined interengaging edges whereby each segment may be independently rotated with respect to the segment to which it is connected, a lens carried by one of the segments, and means on the segments for accurately determining the degree of rotary movement of each segment.

In testimony whereof I have signed my name to this specification.

PAUL L. BRADLEY.